(12) United States Patent
Zhang et al.

(10) Patent No.: US 10,532,832 B2
(45) Date of Patent: Jan. 14, 2020

(54) MAGNETIC LEVITATION REACTION SPHERE

(71) Applicants: TSINGHUA UNIVERSITY, Beijing (CN); BEIJING U-PRECISION TECH CO., LTD., Beijing (CN)

(72) Inventors: Ming Zhang, Beijing (CN); Yu Zhu, Beijing (CN); Anlin Chen, Beijing (CN); Kaiming Yang, Beijing (CN); Rong Cheng, Beijing (CN); Feng Liu, Beijing (CN); Jinchun Hu, Beijing (CN); Chuxiong Hu, Beijing (CN); Dengfeng Xu, Beijing (CN); Haihua Mu, Beijing (CN)

(73) Assignees: TSINGHUA UNIVERSITY, Beijing (CN); BEIJING U-PRECISION TECH CO., LTD., Beijing (CN)

( * ) Notice: Subject to any disclaimer, the term of this patent is extended or adjusted under 35 U.S.C. 154(b) by 282 days.

(21) Appl. No.: 15/568,581

(22) PCT Filed: Mar. 15, 2016

(86) PCT No.: PCT/CN2016/076396
§ 371 (c)(1),
(2) Date: Oct. 23, 2017

(87) PCT Pub. No.: WO2016/169363
PCT Pub. Date: Oct. 27, 2016

(65) Prior Publication Data
US 2018/0170581 A1 Jun. 21, 2018

(30) Foreign Application Priority Data
Apr. 23, 2015 (CN) .......................... 2015 1 0197943

(51) Int. Cl.
*G01C 19/00* (2013.01)
*B64G 1/24* (2006.01)
(Continued)

(52) U.S. Cl.
CPC ............... *B64G 1/24* (2013.01); *H02K 16/00* (2013.01); *H02N 15/00* (2013.01); *G05D 1/08* (2013.01); *H02K 2201/03* (2013.01)

(58) Field of Classification Search
CPC ........................................................ B61G 1/24
(Continued)

(56) References Cited

U.S. PATENT DOCUMENTS 4,991,301 A * 2/1991 Hore .................. G01C 9/06
324/207.15
8,061,047 B2 * 11/2011 Igarashi .................. E21B 47/01
33/302
(Continued)

FOREIGN PATENT DOCUMENTS

CN 101557184 10/2009
CN 102237834 11/2011
(Continued)

OTHER PUBLICATIONS

Notice of Allowance dated Apr. 6, 2017 from corresponding application No. CN 201510197943.2.
(Continued)

*Primary Examiner* — George B Bennett
(74) *Attorney, Agent, or Firm* — Hauptman Ham, LLP

(57) ABSTRACT

A magnetic levitation reaction sphere includes a spherical-housing-shaped rotor and three groups of stators. Each group includes two stators using the sphere center of the rotor as a symcenter. Axes of the three groups are mutually orthogonal. Each stator comprises a stator core and a coil array. An air gap is reserved between an inner surface of (Continued)

each stator core and the outer surface of the rotor. Through grooves are radially formed in the stator cores. The coil arrays are disc-type motor stator windings. Two effective sides of each coil in each coil array are respectively placed in two through grooves of the corresponding stator core. The magnetic levitation reaction sphere has low cost; levitation and rotation driving are integrated; the magnetic levitation reaction sphere has a simple and compact structure, a small size and a low mass, and relates to inherent stable levitation; and the levitation control is simple.

4 Claims, 2 Drawing Sheets

(51) Int. Cl.
*H02N 15/00* (2006.01)
*H02K 16/00* (2006.01)
*G05D 1/08* (2006.01)

(58) Field of Classification Search
USPC .......................................................... 33/318
See application file for complete search history.

(56) References Cited

U.S. PATENT DOCUMENTS

| | | | | |
|---|---|---|---|---|
| 2012/0299405 | A1* | 11/2012 | Li | H02K 23/04 |
| | | | | 310/62 |
| 2018/0083517 | A1* | 3/2018 | Li | H02K 15/026 |
| 2018/0273212 | A1* | 9/2018 | Zhu | B64G 1/285 |

FOREIGN PATENT DOCUMENTS

| | | |
|---|---|---|
| CN | 102291060 | 12/2011 |
| CN | 203180806 | 9/2013 |
| CN | 103633885 | 3/2014 |
| CN | 104143947 | 11/2014 |
| CN | 104753273 | 7/2015 |
| CN | 105141089 | 12/2015 |
| CN | 204967571 | 1/2016 |
| JP | H08109928 | 4/1996 |
| JP | 2002325490 | 11/2002 |
| JP | 2008080888 | 4/2008 |

OTHER PUBLICATIONS

Office Action dated Oct. 9, 2016 from corresponding application No. CN 201510197943.2.
International search report dated May 26, 2016 from corresponding application No. PCT/CN2016/076396.

* cited by examiner

MAGNETIC LEVITATION REACTION SPHERE

RELATED APPLICATIONS

The present application is a National Phase of International Application Number PCT/CN2016/076396, filed Mar. 15, 2016, and claims the priority of China Application No. 201510197943.2, filed Apr. 23, 2015.

TECHNICAL FIELD

The present invention relates to the field of aerospace technology, and more particularly, to a magnetic levitation reaction sphere used for spacecraft attitude control.

BACKGROUND

An in-orbit spacecraft is typically required to have a stable attitude due to the function of a variety of disturbing forces in space. For some of the satellites such as reconnaissance satellites, high precision attitude maneuver is also required. Therefore, a drive device for attitude stability and precise maneuver of the spacecraft is an important part of the development of spacecraft.

A reaction wheel with the principle of conservation of moment of momentum is a drive part most commonly used for attitude control, and the existing mature technology is a mechanical ball bearing reaction wheel. Although a new generation of magnetic levitation reaction wheel has overcome some deficiencies of the mechanical ball bearing reaction wheel, there are still some inherent problems of the reaction wheels, such as a larger volume and mass, higher cost, and intercoupling between multi-reaction wheels.

In the 21st century, small satellite technology characterized by lighter weight, smaller size, and lower cost has attracted the attention of the world. In terms of reducing the volume of the satellite, increasing the payload of the satellite, and reducing the cost, the defects of the existing reaction wheel have hindered the miniaturization and low cost of the satellite to a certain extent.

A magnetic levitation reaction sphere may solve the problem of the above reaction wheel. However, the existing magnetic levitation reaction sphere technology mostly is a permanent-magnetic synchronous magnetic levitation reaction sphere with complex manufacturing process and expensive cost, which is not conducive to the miniaturization and low cost and limits its application. Most of the existing inductive magnetic levitation reaction spheres cannot achieve the integration of the levitation and the driving, which is not conducive to the attitude control of the spacecraft; and the levitation thereof is typically achieved by application of attractive levitation, not an inherently stable levitation system, and has complex levitation control.

SUMMARY

It is an object of the present invention to provide a magnetic levitation reaction sphere which is miniaturized and low cost, wherein levitation and rotation driving are integrated, and inherently stable levitation is achieved.

The technical solution of the invention is provided as follows:

A magnetic levitation reaction sphere, wherein the magnetic levitation reaction sphere comprises a rotor and stators; the stators comprises three groups of stators, each group of the three groups of stators comprises two stators, and a symcenter of the two stators is a sphere center of the rotor, and axes of the three groups of stators are mutually orthogonal, and each of the stators comprises a stator core and a coil array; an inner surface of the stator core fitted to the rotor is a spherical surface, an air gap is reserved between the inner surface of the stator core and an outer surface of the rotor, and through grooves are radially formed in the stator cores and are evenly distributed on the circumference of the stator core; the coil array adopts stator windings of a disc-type motor, two effective sides of each coil in the coil array are placed in two through grooves of the stator core respectively; the number of the coils of each stator is half of or equal to the number of the through grooves; and the rotor is spherical-housing-shaped and is made of a conductive metal material.

The rotor is formed by combining two hemispherical housings. The through grooves are planar through grooves or curved through grooves. An inner spherical housing made of a permeability magnetic material is embedded in the rotor, and the outer surface of the inner spherical housing are fitted to the inner surface of the rotor.

Compared with the prior technical solution, the invention has the following advantages and high-lighting technical effects: in the invention, the magnetic levitation reaction sphere is applied for controlling the attitude of the satellite, which faultlessly solves the problems inherent to traditional reaction wheels, such as a larger volume and mass, higher cost, and intercoupling between multi-reaction wheels. The magnetic levitation reaction sphere in the present invention employs inductive levitation and driving and has low cost; levitation and rotation driving are integrated; the magnetic levitation reaction sphere has a simple and compact structure, a small size and a low mass, and belongs to inherently stable levitation; and the levitation control is simple.

1—stator, 2—stator core, 3—coil array, 4—rotor, 5—air gap, 6—through groove, 7—coil, 8—effective side, 9—rotor hemispherical housing, 10—surface of the upper part of the through groove, 11—planar through groove, 12—curved through groove.

DETAILED DESCRIPTION OF THE PREFERRED EMBODIMENTS

The present invention is further explained in detail in connection with the accompanying drawings.

Figure 1:
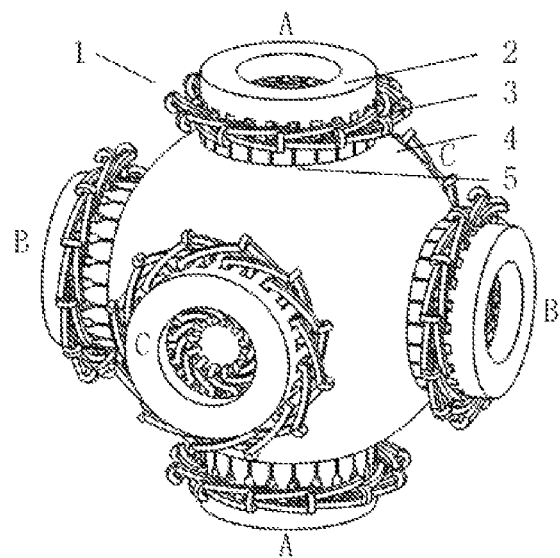
FIG. 1 is a schematic view illustrating an embodiment of the magnetic levitation reaction sphere provided by the present invention.

FIG. 1 is a schematic view illustrating an embodiment of the magnetic levitation reaction sphere provided by the present invention, wherein the magnetic levitation reaction sphere comprises a rotor 4 and six stators 1, and an air gap 5 is formed between each of the stators 1 and the rotor 4. The rotor 4 is a spherical housing, and the six stators 1 are divided into three groups numbered by A, B, and C, each group comprises two stators, and a symcenter of the two stators is a sphere center of the rotor 4, and axes of the three groups of stators are mutually orthogonal. Each stator 1 comprises a stator core 2 and a coil array 3.

Figure 2:
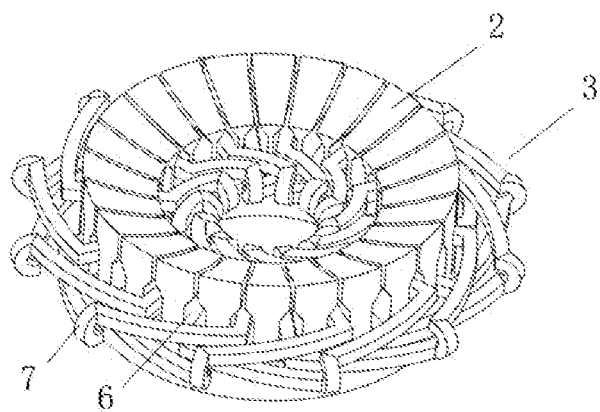
FIG. 2 is a schematic view illustrating the stator structure in the embodiment.
Figures 3A, 3B:
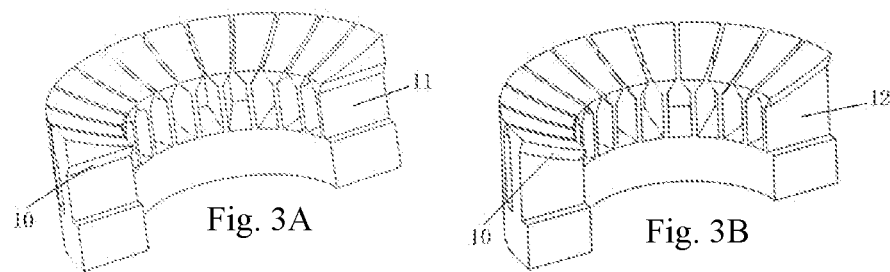
FIG. 3a and FIG. 3b are schematic views illustrating the shape of the through groove in the embodiment.
Figure 4:
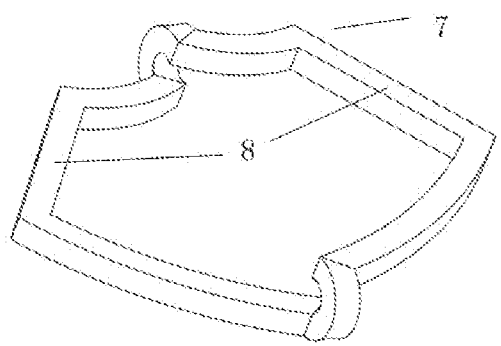
FIG. 4 is a schematic view illustrating the coil structure in the embodiment.

FIG. 2 is a schematic view illustrating the stator structure in the embodiment. The upper surface of the stator core 2 is a spherical surface. Through grooves 6 are formed in the circumference, and are evenly distributed in the circumference of the stator core 2. The through grooves are planar through grooves 11 or curved through grooves 12, as shown in FIG. 3a and FIG. 3b. The planar through grooves are showed in FIG. 3a, the surface 10 of the upper part of the through groove is a flat surface, and such kind of through grooves are easy to process. The curved through grooves is showed in FIG. 3b, the surface 10 of the upper part of the through groove is a curved surface, and such kind of through grooves are conducive to distribution of the magnetic field. The number of the through grooves 6 is determined according to the number of through grooves commonly utilized in conventional disc-type motor stator core, and a total of 24 through grooves are provided in this embodiment. The coil array 3 adopts disc-type motor windings. The number of the coils 7 is equal to the number of the through grooves 6 when the double-layer winding is applied, and the number of the coils 7 is half of the number of the through grooves 6 when the single-layer winding is applied. In this embodiment, the single-layer winding is applied, and there are 12 coils 7 in all, which are evenly arranged on the circumference. As shown in FIG. 4, each coil 7 comprises two effective sides 8, and the shape of the effective side 8 depends on that of the through groove. The two effective sides 8 are disposed in two through grooves, respectively, and the two through grooves are spaced by four through grooves. The two effective sides 8 are staggered in the direction of the stator axis, wherein the higher effective edge is disposed on the upper part of one of the through grooves, and the lower effective side is disposed on the lower part of the other through groove. Two adjacent coils are spaced by one through groove.

Figure 5:
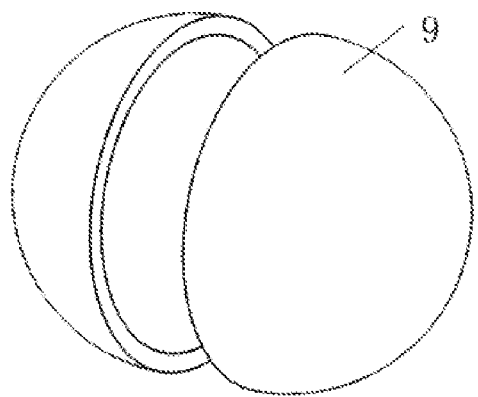
FIG. 5 is a schematic view illustrating the rotor structure in the embodiment.

FIG. 5 is a schematic view illustrating the rotor structure in the embodiment. The material of the rotor 4 is a conductive material such as aluminum, copper and the like. For the convenience of manufacturing, the rotor 4 is formed by combining two hemispherical housings 9. An inner spherical housing made of a permeability magnetic material, such as iron, may be embedded in the rotor 4, and the outer surface of the inner spherical housing is fitted to the inner surface of the rotor.

The electrical angle differences of the alternating current in the two adjacent coils 7 in the coil array 3 of each stator 1 are same so as to form a rotating magnetic field. In this embodiment, the electrical angle difference is $\pi/3$, and the alternating current in the coil array 3 forms a magnetic field rotating around the stator axis in the air gap 5. The rotating magnetic field induces eddy in the rotor 4, and the eddy is forced in the magnetic field to provide the rotor 4 with levitation force along the stator axis and torque about the stator axis.

When alternating current is applied to the coil array 3 of two or more stators 1, each stator 1 provides the rotor 4 with the levitation force along the stator axis and the torque about the stator axis. The levitation force generated by each stator 1 constitutes the levitation force applied to the rotor 4 so as to control stable levitation of the rotor 4, and the torque generated by each stator 1 constitutes the torque applied to the rotor so as to rotate the driver 4 about any axis.

In the operation of the rotor 4, two stators of each group are respectively applied with the same current to provide the rotor with two levitation forces through the stator axis, which have the same magnitude and are in opposite directions, so that the rotor 4 is levitated in the direction of the stator axis. When the air gap 5 between one of the stators and the rotor 4 decreases, the levitation force provided by the stator increases. When the air gap 5 between the other stator and the rotor 4 increases, the levitation force provided by the stator decreases. The two levitation forces work together to make the rotor 4 back to the middle position, so the levitation of the rotor belong to inherently stable levitation, and the levitation control is simple and easy to be realized.

What is claimed is:

1. A magnetic levitation reaction sphere, wherein the magnetic levitation reaction sphere comprises a rotor and stators; the stators comprises three groups of stators, each group of the three groups of stators comprises two stators, and a symcenter of the two stators is a spherical center of the rotor, and axes of the three groups of stators are mutually orthogonal, and each of the stators comprises a stator core and a coil array, an inner surface of the stator core fitted to the rotor is a spherical surface, an air gap is reserved between the inner surface of the stator core and an outer surface of the rotor, and through grooves are radially formed in the stator cores and are evenly distributed on a circumference of the stator core; the coil array adopts stator windings of a disc-type motor, two effective sides of each coil in the coil array are placed in two through grooves of the stator core, respectively; the number of coils of each stator is half of or equal to the number of the through grooves; and the rotor is spherical-housing-shaped and is made of a conductive metal material.

2. The magnetic levitation reaction sphere according to claim 1, wherein the rotor is formed by combining two hemispherical housings.

3. The magnetic levitation reaction sphere according to claim 1, wherein the through grooves are planar through grooves or curved through grooves.

4. The magnetic levitation reaction sphere according to claim 1, wherein an inner spherical housing made of a permeability magnetic material is embedded in the rotor, and an outer surface of the inner spherical housing are fitted to an inner surface of the rotor.

* * * * *